Patented Oct. 23, 1945

2,387,624

UNITED STATES PATENT OFFICE 2,387,624

COPOLYMERIZATION OF METHYL CYCLOPENTADIENE AND CYCLOPENTADIENE

Samuel G. Trepp, Swarthmore, Pa., assignor to The United Gas Improvement Company, a corporation of Pennsylvania No Drawing. Application March 25, 1943, Serial No. 480,536

10 Claims. (Cl. 260—92.6)

This invention pertains generally to the copolymerization of methyl cyclopentadiene and cyclopentadiene.

The invention will be described in connection with the production of a methyl cyclopentadiene-cyclopentadiene polymer of a specific type. However, it is to be understood that it may be employed in the production of copolymers of other types.

Methyl cyclopentadiene and cyclopentadiene may be copolymerized into at least two broad types of copolymers one of which is characterized by being soluble in solvents such as benzene, toluene, chloroform, carbon tetrachloride and high flash naphtha, while the other is characterized by being insoluble in these solvents.

The copolymerization is conveniently carried out while the reactants are in solution in a solvent.

I have discovered that the soluble type of polymer may be produced by a careful control of the polymerizing reaction, including the selection of catalyst.

Examples of catalysts which may be conveniently employed are boron trifluoride-organic solvent complexes for example, boron trifluoride-diethyl ether complex, boron trifluoride-dimethyl ether complex, boron trifluoride-phenyl ethyl ether complex, boron trifluoride-phenyl methyl ether complex, boron trifluoride-toluene complex, boron trifluoride-dioxane complex, complexes with dialkyl and aryl alkyl ethers generally, complexes with alcohols generally and complexes with ketones and especially lower ketones generally; organic solvent complexes of aluminum bromide; organic solvent complexes of stannic chloride; organic solvent complexes of titanium tetrachloride and organic solvent complexes of aluminum chloride.

The preparation of complexes of this character in general comprises adding the metallic halide to the solvent with agitation. If a reaction takes place a definite chemical compound is formed.

There are at least four factors which influence production of soluble copolymer. These four factors are (1) temperature, (2) concentration of cyclic pentadiene, (3) proportion of uniformly distributed catalyst, and (4) time.

Generally speaking, and all other conditions remaining the same it appears that there is a threshold temperature for the formation of insoluble polymer, and that at all temperatures below this threshold temperature the soluble polymer results.

Also generally speaking, and all other conditions remaining the same, it appears that there is a threshold concentration of cyclic pentadiene for the formation of insoluble polymer, and that at all concentrations below this threshold concentration the soluble form of polymer results. The term "concentration of cyclic pentadiene" as used herein and in the claims specifies the percentage by weight of total cyclic pentadiene, whether reacted or not, after all of the materials have been combined.

Also generally speaking, and all other conditions remaining the same, and assuming that all of the materials have been combined, it appears that there is a threshold proportion of uniformly distributed catalyst for the formation of insoluble polymer, and that with all proportions below this threshold the soluble polymer results. In this connection experiments indicate quite clearly that catalyst is apparently used up during the polymerization, and that additional catalyst is required to convert the soluble polymer into insoluble polymer. If the proportion of uniformly distributed catalyst is such that there is no catalyst available for the formation of insoluble polymer, none will be formed.

On the other hand, threshold proportions of catalyst are not required to polymerize all of the cyclic pentadiene into the soluble polymer, although it will be recognized that a minimum proportion will be required for maximum yields.

Also generally speaking, and all other conditions remaining the same, it appears that there is a threshold reaction time for the formation of insoluble polymer, and that for all reaction times below this threshold reaction time the soluble polymer results.

Threshold reaction time, however, differs from the other three factors in that when the threshold reaction time becomes more than one hour the time necessary to form insoluble polymer approaches infinity at a very rapid rate.

When threshold conditions are just exceeded insoluble polymer is formed but not exclusively. This results in a mixture of soluble and insoluble polymers. When exceeding threshold conditions to a greater extent, however, insoluble polymer is formed exclusively. The band over which both soluble and insoluble polymers are formed varies in width with change in conditions. For instance, this band decreases in width with increase in temperature.

Furthermore, the exact values of (1) temperature, (2) concentration of cyclic pentadiene, (3) proportion of uniformly distributed catalyst and (4) time at which insoluble polymer begins to appear may vary somewhat with change in purity or source of cyclic pentadiene or of catalyst or a change in catalyst or solvent. However, the exact values may be readily determined by test.

The type of soluble polymer obtained varies somewhat in physical characteristics with the solvent used during the polymerization. For instance, soluble polymer obtained by copolymerizing methyl cyclopentadiene and cyclopentadiene in solvent naphtha, toluene, or benzene differ somewhat from each other.

Accordingly, in the preparation of my copolymerized methyl cyclopentadiene and cyclopentadiene, a solution of the reactants in a chosen solvent such as toluene is employed.

The complex catalysts are preferably employed in the form of suspensions, emulsions, or solutions in organic solvents of which benzene, toluene, solvent naphtha and petroleum naphtha are examples. Such suspensions, emulsions, or solutions are formed by adding the catalyst to the solvent followed by stirring. As an example, a concentration of boron trifluoride complex in toluene of 0.2% by weight of toluene is very suitable as a catalyst suspension although any other concentration or solvent suitable for the purpose may be employed.

The reactants should not be combined too rapidly since under such circumstances the reaction may proceed too violently and cause local overheating with the production of insoluble polymer, or undesirable color bodies, or both, which it is proposed to avoid.

While the catalyst may be added to the solution of methyl cyclopentadiene and cyclopentadiene particularly when the catalyst itself is in solution or in suspension in a solvent, I prefer to add the solution of methyl cyclopentadiene and cyclopentadiene to a suspension, emulsion or solution of the catalyst. This affords a more exact control of the amount and distribution of material undergoing reaction at any one time. The reaction proceeds much more smoothly than when the catalyst is added to the reactants. In the latter case, no reaction appears to take place until a certain catalyst concentration is reached whereupon the reaction proceeds at a very high rate, and may get out of control.

In either event, however, the addition of one material to the other is preferably accompanied by thorough stirring which is preferably rapid to insure uniform distribution not only of the materials but also of temperature.

In addition the reaction is preferably carried out in apparatus capable of temperature control such as a jacketed vessel provided with an agitator.

A very effective control of the temperature of the reaction and of local superheating is afforded when the preferred procedure is followed.

As an example, the proportion of catalyst may conveniently be between 0.2 to 1.5% by weight of methyl cyclopentadiene and cyclopentadiene present provided the temperature of the reaction is controlled and/or the concentration of cyclic pentadiene is sufficiently low, thus avoiding the formation of insoluble polymer.

A proportion of catalyst of 1.0% by weight of total cyclic pentadiene present is found to be very convenient. It permits wide variation in temperatures and in concentrations of cyclic pentadiene without danger of the formation of insoluble polymer. Furthermore, there is less likelihood of discoloration of the final product than if a larger proportion of catalyst were used.

Incidentally, it appears that the molecular weight of the resulting soluble copolymer may be varied somewhat by varying the proportion of catalyst.

For instance, at all temperatures below 50° C. gel-like polymers are obtained when high proportions of catalyst are employed just below threshold conditions. The ease with which gel-like polymers are obtained increases with decrease in temperature. These polymers are completely soluble.

Incidentally, the formation of gel does not indicate definitely the presence of insoluble polymer as shown above.

Discoloration of the product appears to increase and decrease with increase and decrease in proportion of catalyst so that lower proportions of catalyst yield materials of lesser discoloration.

Temperatures above 100° C. are preferably avoided and it is recommended that great care be taken to keep the temperatures throughout the reaction below this point.

It is found that temperatures between —40° C. to 70° C. are suitable provided the reactants are sufficiently agitated or other steps taken to avoid local overheating. The preferred temperature range is between —40° C. and 30° C.

Incidentally, it appears that the molecular weight of the resulting soluble copolymer may be varied somewhat by varying the temperature.

The increase in color due to increased reaction temperature is quite noticeable at 45° C. and becomes very pronounced as the reaction temperature approaches 100° C.

On the other hand, at 0° C., and even though the proportion of catalyst is fairly high, surprisingly light colored polymers are obtained.

Low reaction temperatures are, therefore, indicated.

Methyl cyclopentadiene-cyclopentadiene solutions of any suitable concentration can be used, keeping in mind what has been said with respect to threshold conditions, although I more often employ concentrations of cyclic pentadiene of from 20 to 30% by weight of total combined materials.

Incidentally, it appears that the molecular weight of the resulting soluble copolymer may be varied somewhat by varying the concentration of cyclic pentadiene in the starting material.

Under the recommended conditions the copolymer is formed in good yield and with a satisfactory color.

The chosen time for the reaction may vary considerably keeping in mind what has been said about threshold conditions. I find that for practicable purposes and good yields other conditions should be chosen such that the reaction time is somewhere in the neighborhood of one hour or more. This is borne out by the fact that the yield increases with reaction time up to a certain point. The time is, of course, preferably chosen to obtain good yields.

The following specific examples will serve to further illustrate the invention.

*Example 1*

A mixture of 70 parts cyclopentadiene and 30 parts methyl cyclopentadiene is dissolved in 100 parts toluene. This mixture is added with stirring to a solution of say .7 part of boron trifluoride-diethyl ether complex in say 300 parts toluene. Sufficient cooling is applied to keep the reaction mixture at a convenient temperature, which may be say between 25° and 30° C. After the addition of reactants to catalyst is completed, stirring is continued for a suitable time, say for 2½ hours, after which water say 25 parts, and lime, say 5 parts, is added to the reaction mixture and agitation continued for say 15 minutes. The aqueous phase is conveniently removed by distillation in an apparatus so arranged that the toluene is returned to the flask but the water collected in a separator. The water-dry solution may be filtered with the addition of filter aid to give a clear solution of the copolymer.

The proportion of cyclopentadiene to methyl cyclopentadiene may be varied at will.

The addition of water, or a water solution containing alkali, to hydrolyze the catalyst makes it possible not only to completely remove the activity of the catalyst and thus stop the reaction at any point, but also makes it possible to remove the corrosive and discoloring acid constituents of the catalyst by a suitable alkali. The failure to substantially completely remove the catalyst and its hydrolysis products may be the cause of serious discoloration. The insoluble reaction products formed during the hydrolysis and neutralization remain behind on the filter leaving a highly purified filtrate.

In the above specific example, both the cyclic pentadiene mixture and the catalyst were in diluted form before addition. Furthermore, as pointed out above, diluted cyclic pentadiene is preferably added to diluted catalyst rather than vice versa to afford a better control of the speed and uniformity of the reaction and of the amount of heat evolved and consequently the type of polymer produced. The reaction runs smoother and is much more easily controlled on a large scale.

In the above example (1) temperature, (2) concentration of cyclic pentadiene, (3) proportion of uniformly distributed catalyst, and (4) reaction time may be varied considerably in the production of soluble polymer having in mind what has been said with respect to threshold conditions. If it is found that insoluble polymer is obtained, one or more of the four conditions, namely (1) temperature, (2) concentration of cyclic pentadiene, (3) proportion of catalyst, and (4) reaction time should be reduced until the soluble polymer is obtained.

Carrying out the polymerization in the presence of a solvent makes it possible to have any desired concentration of cyclic pentadiene.

It is to be noted that my process is of some utility for making soluble copolymer even though insoluble polymer is simultaneously formed, provided, of course, that all of the unsaturate content is not converted into insoluble polymer. When insoluble polymer is formed along with soluble polymer, the insoluble polymer is separated during the filtering step, the soluble polymer remaining in solution in the solvent or solvent mixture originally employed as a diluent.

While in the above example no dilution of the product was required to facilitate hydrolysis and/or filtering, it is to be understood that dilution with a solvent may be employed, if desired, particularly in the case of highly viscous products.

Generally speaking, for the formation of soluble polymer to the exclusion of insoluble polymer and/or extreme discoloration, temperatures should rarely exceed 100° C. and preferably should not exceed 70° C., concentrations of cyclic pentadiene should rarely exceed 50% by weight of the total solution except possibly at low temperatures, and proportion of uniformly distributed catalyst to cyclic pentadiene should rarely exceed 5.0% by weight of cyclic pentadiene with 15% to 25% as a top limit.

It should be kept in mind that there are for practical purposes minimum values for temperature, concentration of cyclic pentadiene, proportion of catalyst and time, which practice will show ought to be exceeded to obtain reasonable yields. For instance, I find that when using ordinary commercial toluene as the solvent a certain quantity of complex catalyst per 100 grams cyclic pentadiene is required before the reaction will commence. On the other hand, if the maximum values given in the previous paragraph for temperature, catalyst and cyclic pentadiene were used simultaneously, some insoluble polymer might be formed, particularly with certain catalysts, even though the reaction time chosen were as short as practice would permit.

It is by the observance of the preferred principles set forth herein that a quality product is produced in good yield.

While in the above specific example, toluene is used as a polymerization medium, it is to be understood that any other suitable solvent might be substituted of which benzene, xylene, ethyl benzene, solvent naphtha, petroleum naphtha, carbon tetrachloride, and ethylene dichloride are examples. The products with benzene and toluene are preferred for certain uses.

Although in the above particular description both reactants, namely, catalyst and cyclic pentadiene, are diluted prior to their admixture, it is to be understood that variations are possible. For instance, it is conceivable that all of the diluent may be first mixed with one of the reactants (either catalyst or cyclic pentadiene) and that the other reactant may be added in concentrated form, particularly if the principles set forth herein are closely observed. Or the larger part of the diluent may be added to one of the reactants so that the other is relatively concentrated. It is also conceivable that, with the exercise of extreme care and the closest adherence to the principles set forth herin, both reactants might possibly be employed in relatively concentrated form. Other variations are possible. When adding one liquid to another with agitation, I find it convenient and often preferable to do this below the surface of one of the liquids.

Any other suitable alkali such as sodium hydroxide, sodium bicarbonate, magnesium hydroxide, an amine or other basic substance might be substituted for lime in the above specific examples, followed by a non-acidic drying agent such as $Na_2SO_4$, or soda lime. Both neutralization and drying is effected by CaO.

The product may be used for many purposes, for instance, for lacquers generally, for varnishes either alone or in admixture with other resins, for enamels, for paints, or in fact for coating compositions generally. It is also useful for electrical insulation purposes, particularly when applied as a coating.

It is possible to obtain soluble copolymer of higher viscosity or of otherwise changed characteristics by starting with a solution of soluble copolymer and stopping the reaction before threshold conditions are exceeded.

All unsaturates which are polymerizable under the conditions obtaining during my polymerization step other than methyl cyclopentadiene and cyclopentadiene are preferably excluded to avoid copolymerization therewith.

Methyl cyclopentadiene is theoretically capable of existing in three isomeric forms as follows:

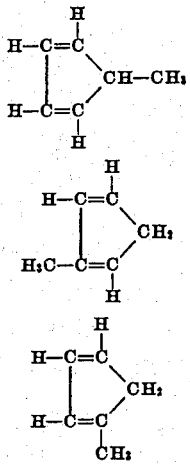

any one or more of which may be present.

Among the catalysts which may be generally substituted for boron trifluoride-organic solvent complexes in the preparation of my new copolymer are ferric chloride-organic solvent complexes, zinc chloride-organic solvent complexes, aluminum chloride-organic solvent complexes, aluminum bromide-organic solvent complexes, antimony chloride-organic solvent complexes, antimony bromide-organic solvent complexes, titanium chloride-organic solvent complexes, stannic chloride-organic solvent complexes, organic acid sulfates, for example alkyl sulfuric acids, and natural or artificially activated clays.

As pointed out above, the molecular weight of the polymers may be varied somewhat by varying (1) the proportion of catalyst, (2) the temperature of reaction and/or (3) the concentration of monomeric starting material. In the practice of my invention, it is preferable to control one or more of these variable so as to produce polymers having a molecular weight in excess of 400 as determined by the Staudinger viscosity method.

In addition to being affected by the above conditions of reaction, the properties of my new resins are governed by the relative proportions of cyclopentadiene and methyl cyclopentadiene. For example, a resin resulting from reacting 90 parts of cyclopentadiene with 10 parts of methyl cyclopentadiene is particularly suitable for varnishes and lacquer purposes.

While any proportion of cyclopentadiene to methyl cyclopentadiene may be employed in the preparation of my new resin such as from 1% to 99% of one to 99% to 1% of the other and particularly 5% to 95% of one to 95% to 5% of the other, I prefer in the case of coating compositions to employ between 50% and 99% cyclopentadiene on the undiluted basis to between 1% and 50% methyl cyclopentadiene on the undiluted basis. 80% to 95% cyclopentadiene to 5% to 20% methyl cyclopentadiene is very suitable particularly when flexibility is desired.

The resin obtained by polymerizing a mixture containing 90% to 95% cyclopentadiene to 5% to 10% methyl cyclopentadiene is excellent.

While normally the cyclopentadiene and methyl cyclopentadiene enter the reaction in an unpolymerized state, if desired, and as a variation, either compound may be added to the polymerizing vessel first and partially polymerized to any desired extent prior to the addition of the other compound in monomeric form or in partially polymerized form.

Advantageously, however, such prior partial polymerization of either or both compounds when resorted to is effected by means of a catalyst or catalysts instead of heat only. In other words, it is desirable that a substantial quantity of heat polymers be absent.

If desired, the reactants may be employed in admixture with additives such as coloring materials, softeners, plasticizers, and the like.

Broadly summarizing: this invention relates to new synthetic resins, and it comprises synthetic resins obtained by polymerizing a mixture of cyclopentadiene and one or more methyl cyclopentadienes, advantageously a mixture of such hydrocarbons as is present in a light oil fraction containing the same, and substantially complete free from other compounds polymerizable under the conditions obtaining, particularly resins having a molecular weight in excess of 400; all as more fully hereinabove set forth and as claimed.

It is to be understood that the above specific examples are by way of illustration. Therefore, changes, omissions, additions, substitutions, and/or modifications might be made within the scope of the claims without departing from the spirit of the invention which is intended to be limited only as required by the prior art.

I claim:

1. A copolymer of methyl cyclopentadiene and cyclopentadiene.

2. A synthetic resin comprising the product resulting from the copolymerization of cyclopentadiene with methyl cyclopentadiene in the substantial absence of other compounds polymerizable under the conditions obtaining.

3. A benzene soluble synthetic resin comprising the product resulting from the copolymerization of cyclopentadiene with methyl cyclopentadiene in the substantial absence of other compounds polymerizable under the conditions obtaining.

4. A benzene insoluble synthetic resin comprising the product resulting from the copolymerization of cyclopentadiene with methyl cyclopentadiene in the substantial absence of other compounds polymerizable under the conditions obtaining.

5. A copolymer of methyl cyclopentadiene and cyclopentadiene, said copolymer having a molecular weight above 400, as determined by the Staudinger viscosity method.

6. A synthetic resin comprising the product resulting from the copolymerization of cyclopentadiene with methyl cyclopentadiene in the substantial absence of other compounds polymerizable under the conditions obtaining, said resin having a molecular weight in excess of 400.

7. A synthetic resin comprising the product resulting from the catalytic copolymerization of cyclopentadiene with methyl cyclopentadiene in the substantial absence of other compounds polymerizable under the conditions obtaining.

8. A new resinous composition for use in liquid coating compositions comprising the product of the copolymerization of from 80% to 99% cyclopentadiene with from 1% to 20% methyl cyclopentadiene in the substantial absence of other compounds polymerizable under the conditions obtaining.

9. A copolymer resulting from the copolymerization of from 50% to 99% cyclopentadiene with from 1% to 50% methyl cyclopentadiene.

10. A copolymer resulting from the copolymerization of from 90% to 95% cyclopentadiene with from 5% to 10% methyl cyclopentadiene.

SAMUEL G. TREPP.